(12) United States Patent
Tzidon et al.

(10) Patent No.: US 6,970,283 B2
(45) Date of Patent: Nov. 29, 2005

(54) MICROMIRRORS ARRAY WITH IMPROVED LIGHT THROUGHPUT

(76) Inventors: Dekel Tzidon, 2 Mazal Akrav street, Hod Hasharon 45309 (IL); Yitzhak Weissman, 3a Kaskani St, Tel Aviv 69499 (IL)

( * ) Notice: Subject to any disclaimer, the term of this patent is extended or adjusted under 35 U.S.C. 154(b) by 0 days.

(21) Appl. No.: 10/618,758

(22) Filed: Jul. 15, 2003

(65) Prior Publication Data

US 2004/0012863 A1 Jan. 22, 2004

Related U.S. Application Data

(60) Provisional application No. 60/395,855, filed on Jul. 16, 2002.

(51) Int. Cl.$^7$ ............................................. G02B 26/00
(52) U.S. Cl. ..................... 359/291; 359/290; 359/223
(58) Field of Search ................. 359/223, 291, 359/290, 292, 224, 330, 323, 324

(56) References Cited

U.S. PATENT DOCUMENTS

| 5,212,582 A | 5/1993 | Nelson |
| 5,233,456 A | 8/1993 | Nelson |
| 5,583,688 A | 12/1996 | Hornbeck |
| 6,268,952 B1 * | 7/2001 | Godil et al. ................. 359/291 |
| 6,382,799 B1 | 5/2002 | Nishikawa et al. |

* cited by examiner

Primary Examiner—Hung Xuan Dang
Assistant Examiner—Tuyen Tra
(74) Attorney, Agent, or Firm—Pearl Cohen Zedek Latzer LLP

(57) ABSTRACT

A micromirror array device comprising at least two of a plurality of zones of separately controllable tiltable reflecting elements, each of the tiltable reflecting elements of a zone being capable of tilting about an axis of predetermined tilt orientation associated with the zone between a first reflecting position reflecting an incident beam to a predetermined first direction (on direction), and a second reflecting position reflecting the incident beam to a predetermined second direction (off direction), each of the zones having a predetermined tilt orientation for all reflecting elements in that zone, that is different from the tilt orientation of at least one other zone of the zones.

23 Claims, 11 Drawing Sheets

MICROMIRRORS ARRAY WITH IMPROVED LIGHT THROUGHPUT

FIELD OF THE INVENTION

The present invention relates to a digital mirror device (DMD). More particularly it relates to a novel micromirrors array design for a DMD chip. This application claims the priority benefit of U.S. Pat. No. 60/395,855, filed Jul. 16, 2002.

BACKGROUND OF THE INVENTION

Presently, there are two leading technologies involved in image generation in electronic projectors: digital mirror device (DMD) and liquid crystal device (LCD). The present invention relates to the DMD technology.

Typically, a DMD chip is made of an array of bi-stable micromirrors, which may be repositioned between two stable positions. The angle between the planes of the mirrors in the two stable positions is called "the deflection angle". The position of each mirror can be independently switched by electronic control. The projector is designed in such a manner that in one position (the "on" position) the light from the mirror is directed towards the projection lens. In the other ("off") position, the light is dumped (directed away from the lens, and ideally absorbed). By controlling the positions of the mirrors it is possible to create a binary image. Gray levels are generated by vibrating the mirrors during the video frame between the two positions in a predetermined pattern/duty cycle. The amount of light reaching the screen from a given micromirror is proportional to the duty factor of the "on" position.

One of the main quality parameters in an image projector is the light output. The light throughput of an optical device is limited theoretically by a quantity called "étendue". When the light passes through several components in series, the component with the smallest étendue becomes the limiting factor of the entire system. Generally, the price of an optical component increases with its étendue. Therefore, the most expensive component is usually the limiting factor in the light output. In electronic projectors, these are the image generating devices, which are either DMD's or LCD's.

The étendue E of an optical component is given by $E = A \cdot \Omega$, Equation (1), where A is the component entrance pupil area, and $\Omega$ is the component solid acceptance angle. For small angles, we can approximate $\Omega = \theta^2$, where $\theta$ is the planar acceptance angle, so that $$E = A \cdot \theta^2 \quad \text{Equation (2)}$$

The étendue of a DMD chip is determined by its area and by the mirror deflection angle. The price of the DMD chip increases with its area, and, therefore, there is a constant market pressure to reduce the chip size. This leads to a decrease in étendue. The deflection angle is mainly limited by technological constraints. Currently, DMD micromirror arrays are available with a deflection angle of 20°. A DMD chip with a deflection angle of 24° is under development. This is sought in order to allow size (and price) reduction, without reducing the chip étendue.

In U.S. Pat. No. 6,382,799 (Nishikawa et al.), incorporated herein by reference, an attempt was made to increase the étendue of a DMD chip by way of providing greater lateral separation between beams reflected off the DMD chip. There was disclosed a projection optical apparatus has a light source for emitting light, an illumination optical system for emitting as illumination light the light radiated from the light source, a Digital Micromirror Device (DMD), having a plurality of micromirrors, a total internal reflection prism composed of a first prism for totally reflecting and thereby directing the illumination light exiting from the illumination optical system to the DMD and a second prism for transmitting the signal light reflected from the DMD, and a projection optical system for projecting the signal light transmitted through the second prism onto a projection surface. The prism assembly is introduced here to optically increase the lateral distance between the deflected beams off each micromirror, without having to increase the distance of the DMD chip from the lens, thus effectively increasing the étendue of the system.

An object of the present invention is to provide a novel design for a DMD chip in order to increase DMD chip étendue without increasing its area or deflection angle. This will allow projector designs with increased light output without increase in DMD cost. Such development will improve the position of DMD based projectors in competition with LCD based projectors.

SUMMARY OF THE INVENTION

There is thus provided, in accordance with a preferred embodiment of the present invention, a micromirror array device comprising at least two of a plurality of zones of separately controllable tiltable reflecting elements, each of the tiltable reflecting elements of a zone being capable of tilting about an axis of predetermined tilt orientation associated with the zone between a first reflecting position reflecting an incident beam to a predetermined first direction (on direction), and a second reflecting position reflecting the incident beam to a predetermined second direction (off direction), each of said at least two of a plurality of zones having a predetermined off direction for all the reflecting elements in that zone, that is different from the off direction of at least one other zone of said at least two of a plurality of zones.

Furthermore, in accordance with a preferred embodiment of the present invention, said at least two of a plurality of zones comprises two zones.

Furthermore, in accordance with a preferred embodiment of the present invention, said at least two of a plurality of zones comprises four zones.

Furthermore, in accordance with a preferred embodiment of the present invention, the predetermined tilt orientation for all the reflecting elements in a zone is orthogonal to the tilt orientation of the one other zone of said at least two of a plurality of zones.

Furthermore, in accordance with a preferred embodiment of the present invention, said at least two of a plurality of zones are adjacent each other.

Furthermore, in accordance with a preferred embodiment of the present invention, each reflecting element is electrically actuated, being separately controlled by a control unit.

Furthermore, in accordance with a preferred embodiment of the present invention, a lens is further provided in front of the array in a predetermined distance from the array, placed in the on direction of all the reflecting elements, of the plurality of zones.

Furthermore, in accordance with a preferred embodiment of the present invention, a normal of a given reflecting element in a zone of said at least two of a plurality of zones, when the reflecting element is positioned in the off direction coincides at a point on a plane adjacent the lens with a normal of a corresponding reflecting element in one other zone of said at least two of a plurality of zones, when the corresponding reflecting element is positioned in the off direction.

Furthermore, in accordance with a preferred embodiment of the present invention, each of said at least two of a plurality of zones having a predetermined tilt orientation for all the reflecting elements in that zone, that is different from the tilt orientation of at least one other zone of said at least two of a plurality of zones.

Furthermore, in accordance with a preferred embodiment of the present invention, said at least two of a plurality of zones comprises two zones.

Furthermore, in accordance with a preferred embodiment of the present invention, said at least two of a plurality of zones comprises four zones.

Furthermore, in accordance with a preferred embodiment of the present invention, the predetermined tilt orientation for all the reflecting elements in a zone is orthogonal to the tilt orientation of the one other zone of said at least two of a plurality of zones.

Furthermore, in accordance with a preferred embodiment of the present invention, said at least two of a plurality of zones are adjacent each other.

Furthermore, in accordance with a preferred embodiment of the present invention, each reflecting element is electrically actuated, being separately controlled by a control unit.

Furthermore, in accordance with a preferred embodiment of the present invention, a lens is further provided in front of the array in a predetermined distance from the array, placed in the on direction of all the reflecting elements, of the plurality of zones.

Furthermore, in accordance with a preferred embodiment of the present invention, a normal of a given reflecting element in a zone of said at least two of a plurality of zones, when the reflecting element is positioned in the off direction coincides at a point on a plane adjacent the lens with a normal of a corresponding reflecting element in one other zone of said at least two of a plurality of zones, when the corresponding reflecting element is positioned in the off direction.

Furthermore, in accordance with a preferred embodiment of the present invention, there is provided a method for steering light comprising:

providing at least two of a plurality of zones of separately controllable tiltable reflecting elements, each of the tiltable reflecting elements of a zone being capable of tilting about an axis of predetermined tilt orientation associated with the zone between a first reflecting position reflecting an incident beam to a predetermined first direction (on direction), and a second reflecting position reflecting the incident beam to a predetermined second direction (off direction), each of said at least two of a plurality of zones having a predetermined off direction for all the reflecting elements in that zone, that is different from the off direction of at least one other zone of said at least two of a plurality of zones;

providing an illuminating beam source for separately illuminating each of said at least two of a plurality of zones of separately controllable tiltable reflecting elements;

illuminating said at least two of a plurality of zones of separately controllable tiltable reflecting elements;

separately manipulating each of the separately controllable tiltable reflecting elements between the on direction and off direction.

Furthermore, in accordance with a preferred embodiment of the present invention, each of said at least two of a plurality of zones having a predetermined tilt orientation for all the reflecting elements in that zone, that is different from the tilt orientation of at least one other zone of said at least two of a plurality of zones.

Furthermore, in accordance with a preferred embodiment of the present invention, said at least two of a plurality of zones comprises two zones.

Furthermore, in accordance with a preferred embodiment of the present invention, said at least two of a plurality of zones comprises four zones.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION OF PREFERRED EMBODIMENTS

The present invention seeks to increase the étendue of a micromirror array by providing a novel design for the micromirror array.

A main aspect of the present invention is étendue enhancement by way of increasing the acceptance angle for a given DMD chip to projection lens separation.

A main feature of the present invention is the provision of a micromirrors array comprising a plurality of tiltable elements arranged in groups of elements having different off-beam directions. It is asserted that by providing groups of reflecting elements with different off-beam directions while maintaining a single on-direction shared by all reflecting elements, the acceptance angle is increased.

One way of implementing a micromirror array with a plurality of off-beam directions is to provide a micromirror array comprising a plurality of tiltable elements arranged in groups of elements having different tilt orientations.

Another way of implementing a micromirror array with a plurality of off-beam directions is to provide micromirror array comprising a plurality of tiltable elements arranged in groups of micromirror elements having same tilt orientation, but different on and off directions, as long as the on-direction is shared by all elements.

Yet another way of implementing a plurality of a micromirror array with a plurality of off-beam directions may include a micromirror array comprising a plurality of tiltable elements arranged in groups of micromirror elements having same tilt orientation, but different initial orientations.

It is asserted that other ways of implementing a plurality of a micromirror array with a plurality of off-beam directions is possible, and is covered by the scope of the present invention.

In order to understand how the acceptance angle of a DMD chip is increased in the present invention, we propose to calculate it for a conventional DMD chip.

The actual value of the DMD acceptance angle depends on the design details of the projector. Most important factors are the incidence angle of the illuminating beam, and the distance between the DMD and the projection lens. In order to perform the calculation, we have to assume certain values for these parameters. To simplify the calculation, we will assume here that the illumination angle is such that the "on" beam direction is perpendicular to the DMD plane. Such design is typical to projectors with centered projection lens (lens optical axis hits the DMD at the center).

Figure 1A:
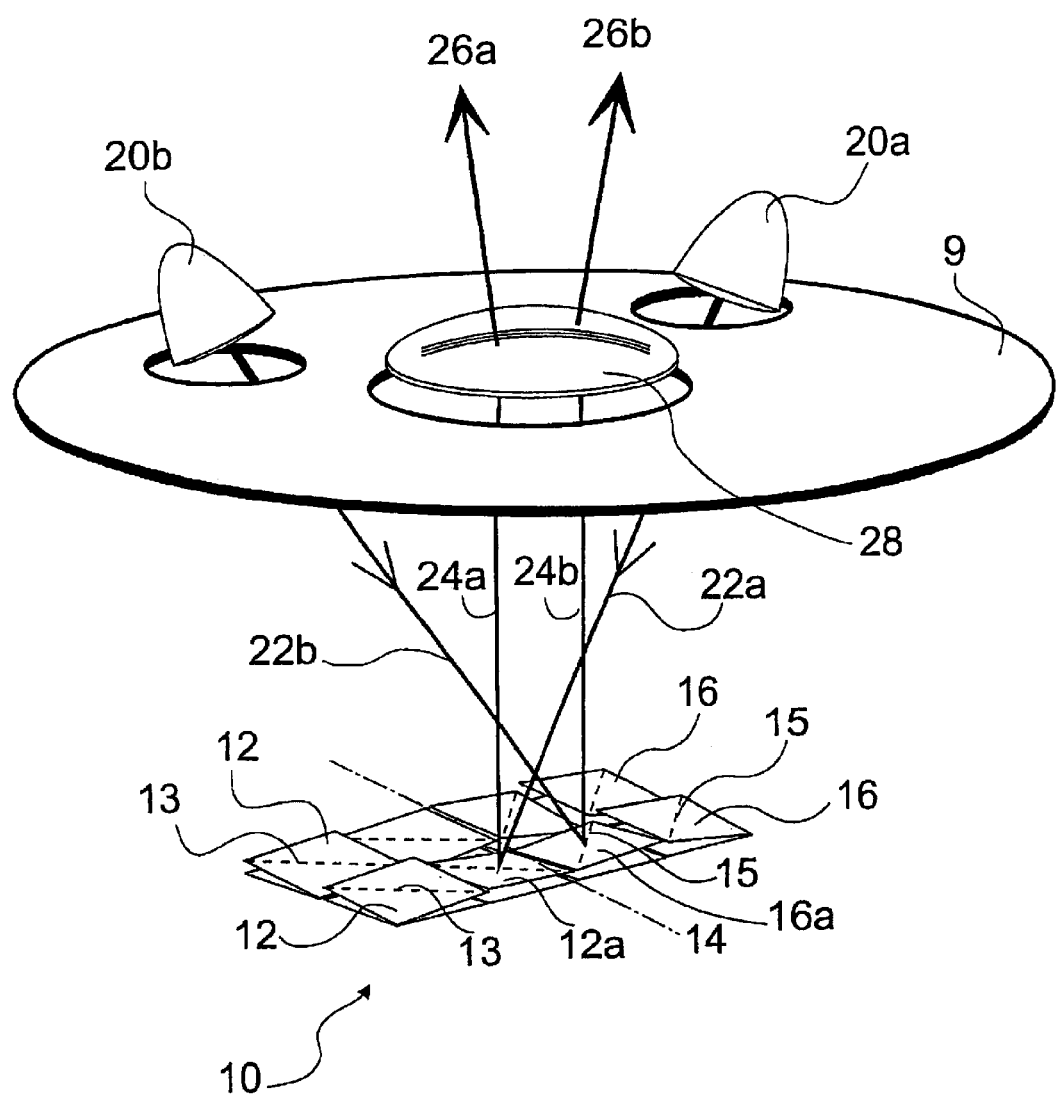
FIG. 1a illustrates a micromirrors array in accordance with a preferred embodiment of the present invention, with two partitions of different tilt orientations. Two elements of the micromirror array are tilted in an "on" position reflecting light through a projector lens.

Reference is made to FIG. 1a illustrating an isometric view of a micromirrors array 10 in accordance with a preferred embodiment of the present invention, with two partitions of different tilt orientations, divided by line 14. The four elements 12 on the left-hand side are each tiltable between two positions about a predetermined axis 13, the tilt axes of the elements of the same tilt orientation being parallel to each other. It is noted that in current DMD chips the micromirrors array elements are typically square or rectangular, and the tilt axis of an element in that array is diagonal with respect to the element. The present invention is not limited to DMD elements of that kind only. Regardless of the manufacturing technique of DMD chips, the present invention may easily be implemented in cases where the tilt axis of an element is not the diagonal one, should that be the chosen manufactured orientation of the micromirror array elements, or in cases where the shape of an element is not rectangular or square. The present invention does not deal with the physical manufacturing of DMD chips either. See U.S. Pat. No. 5,583,688, U.S. Pat. No. 5,233,456, U.S. Pat. No. 5,212,582, all incorporated herein by reference, for examples of DMD chips.

The four elements 16 on the right-hand side of the array are each tiltable between two positions about a predetermined axis 15, the tilt axes of the elements of the same tilt orientation being parallel to each other. Axes 15 and axes 13 are oriented in different directions. For square elements the orientation of one group of parallel axes (13) is preferably orthogonal to the orientation of the second group of the parallel axes (15).

Two elements of the micromirror array—element 12a from the left-hand group of micromirror elements and element 16a from the right-hand group of micromirror elements—are tilted in an "on" position reflecting light through a projector lens. Two illuminating beam sources are used in the present configuration—one illuminating beam source for each group of micromirrors array elements having the same tilt orientation. The illuminating beams are shown in the diagrams as two separate beams for clarity reasons only, it should be noted that the source of these beams can be a single illuminating beam with beam-splitting prism or any other beam-splitting arrangement. In FIG. 1a illuminating beam source 20a on the right-hand side is directed into the left-hand group of micromirrors array elements 12, whereas illuminating beam source 20b on the left-hand side is directed into the right-hand group of micromirrors array elements 16. This crossed configuration is a preferred configuration but not the only possible configuration, and other alternative configurations may be used as long as each group of micromirror array elements of a certain tilt orientation receives its illuminating beam.

Elements 12a and 16a are tilted to an "on" position. Light ray 22a from the illuminating beam source 20a is reflected off element 12a as beam 24a into lens 28 and is refracted by the lens 28 as light ray 26a. Light ray 22b from the illuminating beam source 20b is reflected off element 16a as ray 24b into lens 28 and is refracted by the lens 28 as light ray 26b. Note that plane 9 (illustrated here as a disc) is not a physical feature of the present invention, rather a graphical aid for clarifying the relative positions of the illuminating beam sources, the lens and the micromirrors array. It is convenient to refer to this plane when viewing FIGS. 4, 6, 7 and 8, which are referred to and explained hereinafter. Note further that lens 28 is merely a graphic representation for any kind of optical focusing or directing arrangement, and is shown as a single lens only for brevity.

Figure 1B:
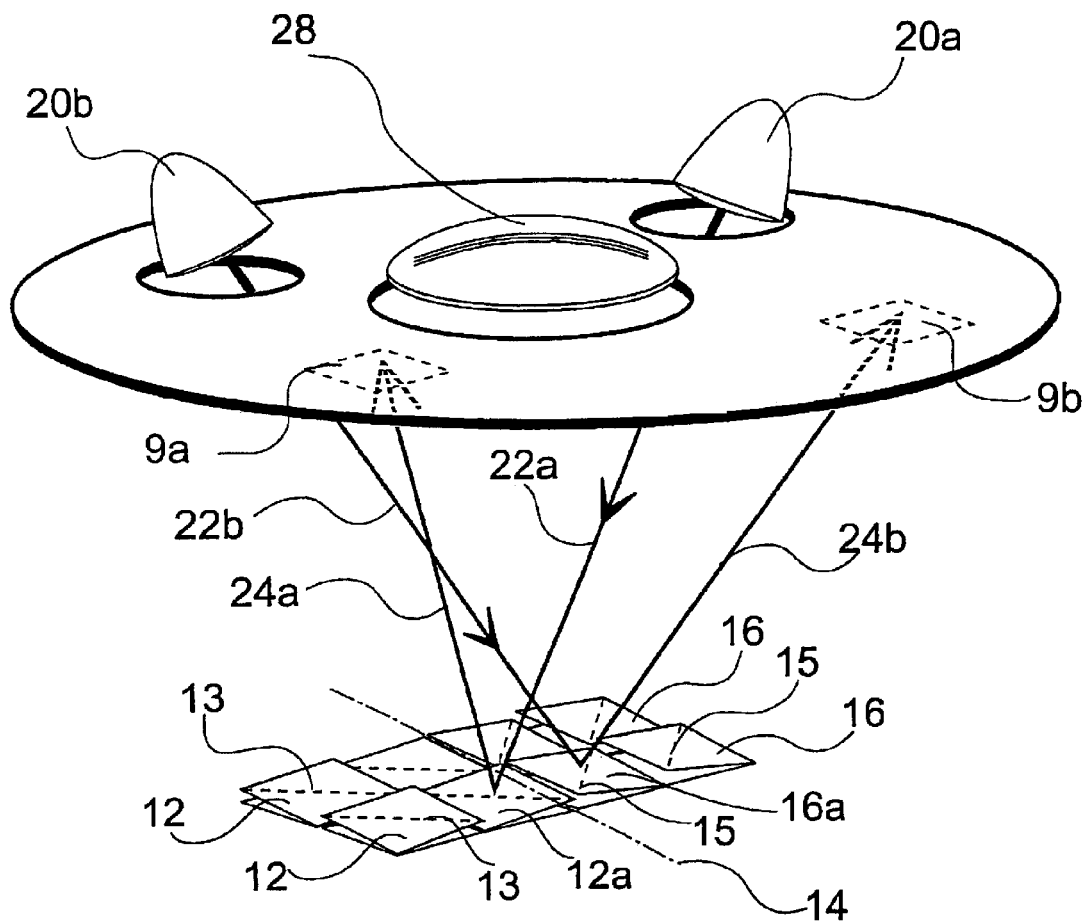
FIG. 1b illustrates the micromirrors array shown in FIG. 1, wherein the two elements of the micromirrors array are now tilted in an "off" position, reflecting light away from the lens.

FIG. 1b illustrates an isometric view of the micromirrors array shown in FIG. 1a, wherein the two elements (12a, 16a) of the micromirrors array are now tilted in an "off" position, reflecting light away from the lens, to damping zones (9a and 9b symbolizing dumping zones directions). Again, note that plane 9 is not a physical feature of the present invention. In some embodiments of the present invention the dumping zones may be provided in the form of an internal wall of an electronic projector where the micromirrors array of the present invention is used for image generation, preferably in the form of a dark absorbing surface.

Figure 2:
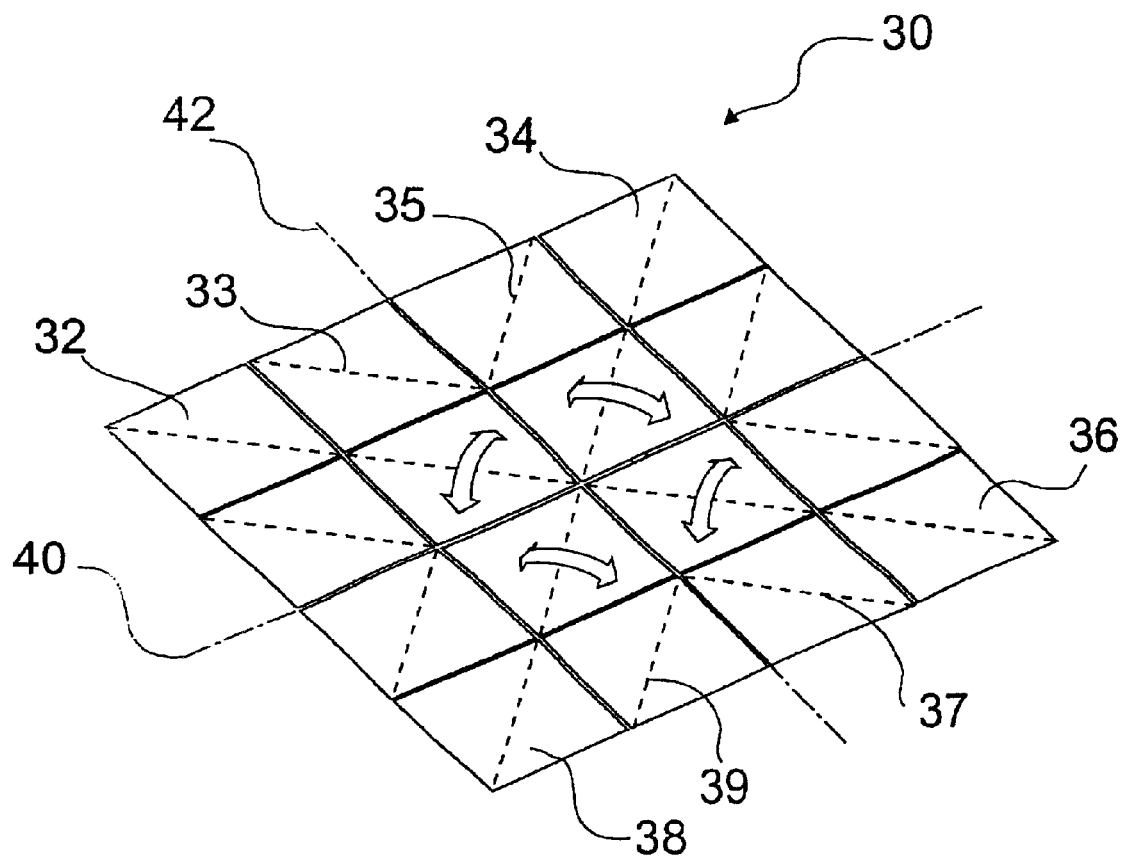
FIG. 2 illustrates a micromirrors array in accordance with another preferred embodiment of the present invention, with four partitions of different tilt orientations.

FIG. 2 illustrates an isometric view of a micromirrors array 30 in accordance with another preferred embodiment of the present invention, with four partitions of different tilt orientations. Here there are four groups of tiltable micromirror elements divided between crossed borderlines 40 and 42. The elements of the upper left-hand group of micromirror elements 32 each tiltable about parallel axes 33. The elements of the upper right-hand group of micromirror elements 34 each tiltable about parallel axes 35. The elements of the lower right-hand group of micromirror elements 36 each tiltable about parallel axes 37. The elements of the lower left-hand group of micromirror elements 38 each tiltable about parallel axes 39. In this embodiment axis 33 (of the group of micromirror elements 32) and axis 37 (of the group of micromirror elements 36) are parallel to each other, as are axis 35 (of the group of micromirror elements 34) and axis 39 (of the group of micromirror elements 38). However in other preferred embodiments of the present invention it is possible to provide each group of micromirror elements with a distinct tilt orientation that is not parallel to the tilt orientation of other micromirror elements groups. In case of the latter it is imperative that an illuminating beam source is accounted for each group of micromirror elements.

Figure 3:
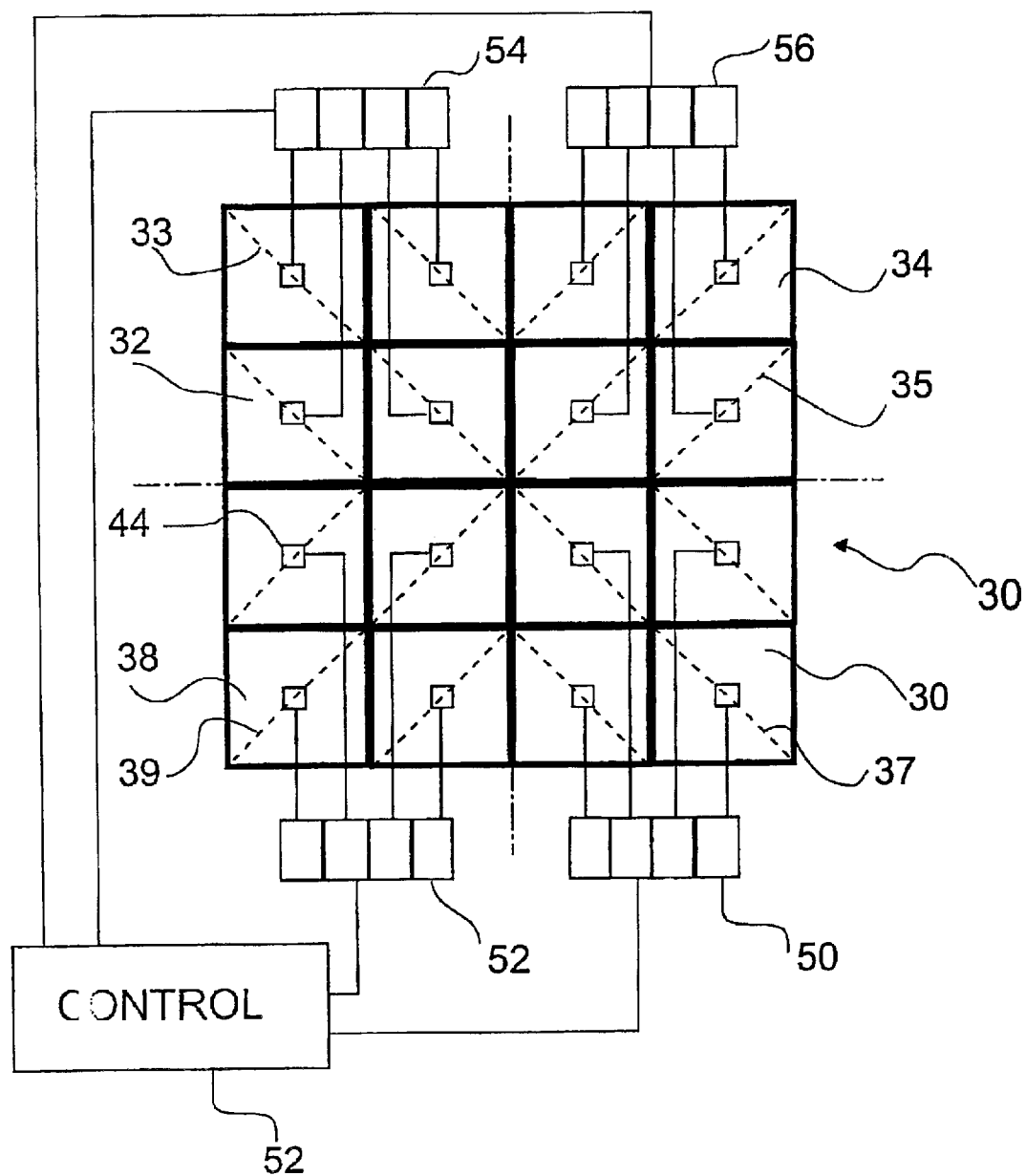
FIG. 3 illustrates a typical electronic scheme for a DMD chip with a micromirrors array in accordance with a preferred embodiment of the present invention, having four partitions of different tilt orientations.

FIG. 3 illustrates a typical electronic scheme for a DMD chip with a micromirrors array in accordance with a preferred embodiment of the present invention., having four partitions of different tilt orientations. Each micromirror element is coupled to an electronic tilting component 44 that when subjected to an electric signal causes the micromirror to tilt from a first position to a second tilted position, and when not subjected to that signal (or when subjected to a different electric signal) causes the micromirror to tilt back to its original first position. Each electronic component is separately coupled to a driver (here we show four groups of drivers, 50, 52, 54, 56) that communicates with a control unit 58, which controls the tilting of each element in whatever predetermined manner desired. This scheme is given only as an example, and in no way limits the scope of the present invention. It is noted, again, that the object of the present invention is to enhance étendue by way of providing a novel design of micromirror array elements.

Figure 4:
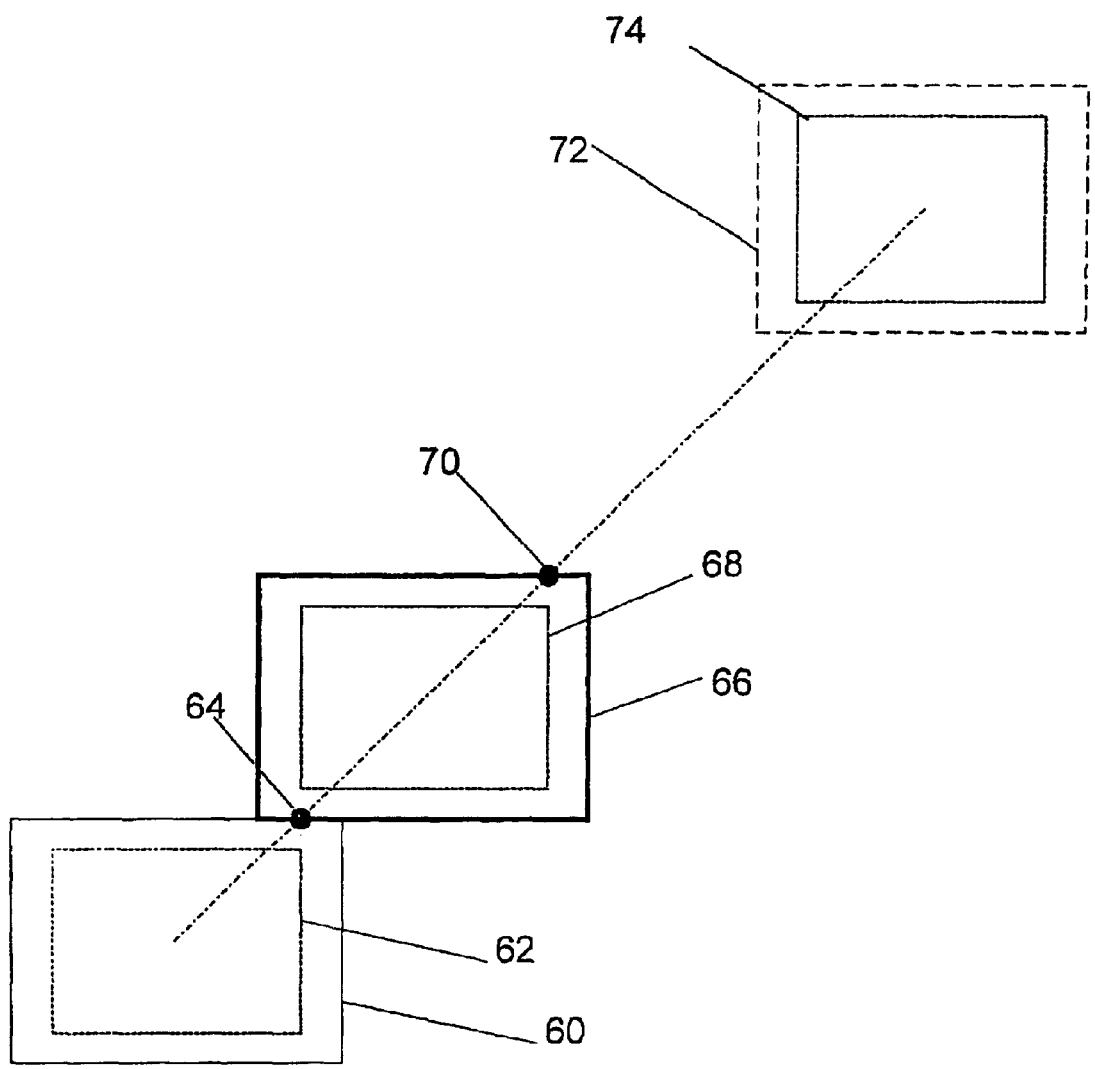
FIG. 4 demonstrates the "on" and "off" positions of the reflected beams from a prior art micromirrors array (with no subdivisions of tilt orientation partitions) on the entrance plane of the projection lens.

FIG. 4 demonstrates the "on" and "off" positions of the reflected beams from a prior art micromirrors array (with no subdivisions of tilt orientation partitions) on the entrance plane of the projection lens.

The optical geometry may be further understood by reviewing the footprints of the three involved beams of light in the plane of the projection lens entrance pupil. The three beams are:

The illuminating beam (60, 62)

The "on" beam (66,68)

The "off" beam (72,74)

These footprints are shown schematically in FIG. 4. All beams shown in FIG. 4 are divergent (or convergent) beams, with a certain acceptance angle θ. In principle, the divergence angle of the beams that are reflected from the DMD is larger compared to the convergence angle of the incident beam due to scattering and diffraction, but we will disregard this effect and assume that both angles are equal. We also assume that the DMD has a 4:3 aspect ratio (this serving as an example only).

For each beam, we can define the "parallel component". This component includes all beam rays that propagate parallel to the propagation direction of the beam. The parallel component has a zero divergence angle. In FIG. 4 we show the (virtual) footprints of the parallel component of each beam on an arbitrary plane by a dotted rectangle. Indicated are the parallel component 62 of the illuminating beam 60 from the source, the parallel component 68 of the "on" beam 66 and the parallel component 74 of the "off" beam 72. The parallel component footprint of the "on" beam 68 is also the vertical projection of the DMD active area.

All footprint contours in FIG. 4 are shown as rectangles. This is strictly true only for the parallel components. However, for simplicity, we show the beams footprints as rectangles.

In practice, the illuminating beam 60 has a circular cross section. We show it in FIG. 4 as having a rectangular cross-section for the sake of clarity. This fact does not affect our arguments.

In FIG. 4 we also show the intersection points of the normals to the central DMD mirror with the drawing plane. There are two such points, corresponding to the two positions of the micromirror: the normal to the "on" position 64 and the normal to the "off" position 70. The line joining these points makes an angle of 45° with the edges of the beam footprint. This is due to the fact that in practice the micromirrors are square, and their axis of deflection is along their diagonal.

The normal intersection points together with the position of the illumination beam footprint determine the locations of the reflected beams The center of a reflected beam is given by a (planar) reflection of the illumination beam center with respect to the corresponding normal intersection point.

The optical geometry must be designed in such a manner that there will be no overlaps between the three footprints. The geometry in FIG. 4 satisfies this condition. It is evident that in this geometry any increase in the divergence angle will give rise to an overlap between the illuminating beam and the "on" beam footprints. This is due to the fact that by just increasing the divergence, the parallel components remain intact, but the footprint itself increases in area. This is how the optical geometry and the mirror deflection angle determine the DMD acceptance angle, which is the maximal allowed. convergence angle of the illuminating beam.

Figure 5:
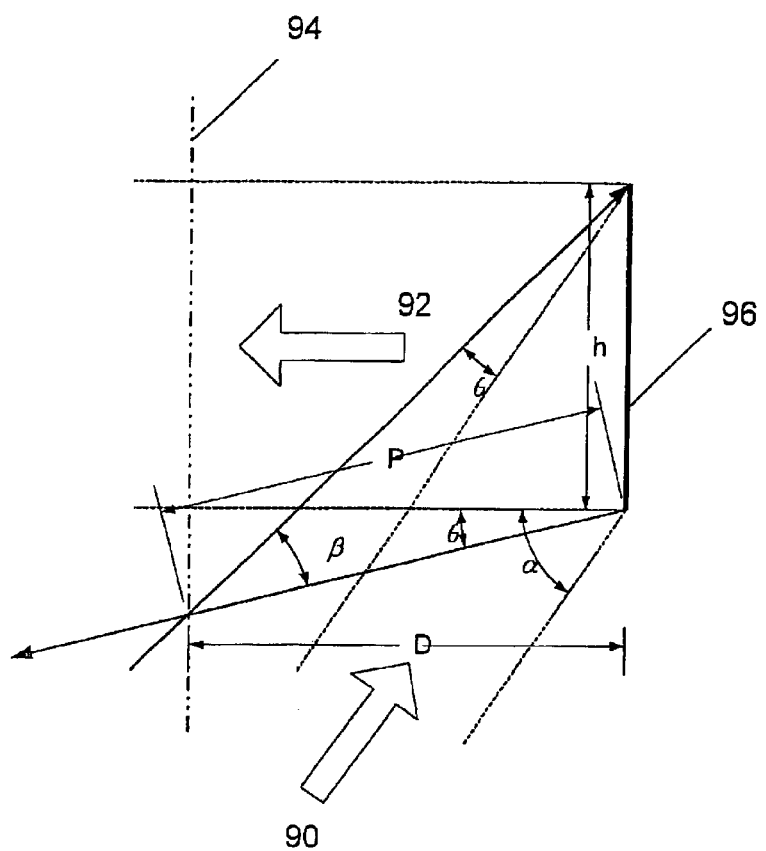
FIG. 5 illustrates a side view of the optical paths associated with a prior art DMD chip.

In order to compute the acceptance angle for a given deflection angle we must look into another optical cross section that is shown in FIG. 5. This figure shows several features in a plane normal to the plane of FIG. 4, and intersecting it along the line joining the normal intersection points (shown in FIG. 4 as a dash-point line). Plane 94 is the plane of the pupil entrance of the projector lens. We have denoted the acceptance angle and the mirror deflection angle by θ and α respectively.

The bulky arrow represents the beams (90, 92) and the solid arrows represents the upper edge of the illumination beam 90 and the lower edge of the reflected "on" beam 92 (θ is the angle between the solid and dotted lines)

By observing FIG. 5 it becomes apparent that $$\beta = \alpha - 2\theta.$$

By the sinus theorem we get $$P = h \frac{\cos(\alpha - \theta)}{\sin(\alpha - 2\theta)}. \quad \text{Equation (3)}$$

Note that h is the distance between the two normals intersection points (as indicated in FIG. 4). Since $$D = P \cos \theta,$$

we finally get $$\frac{D}{h} = \frac{\cos(\alpha - \theta)\cos\theta}{\sin(\alpha - 2\theta)} \quad \text{Equation (4)}$$

The ratio D/h will play a key role in the subsequent analysis. We will refer to it as "the normalized lens distance", and denote it by δ. Equation (4) implicitly determines the acceptance angle θ for given δ and α.

The normalized lens distance is a design parameter. By increasing this parameter, θ increases too, and together with it the projector light output can be increased. On the other hand, the projection lens complexity and price increases. Therefore, a certain compromise is made in practical designs.

A value of 4 for δ seems to be a reasonable choice. In a DMD with a deflection angle of α=20°. These parameters give $$\theta \sim 3.1°.$$ Equation (5)

We propose to divide the DMD into two or more partitions with different orientations for the axes of deflection. We analyze hereinafter the cases of two and four partitions, which seem to be most interesting. We show that in such DMD micromirror arrays one can increase the acceptance angle relative to the normal DMD for the same values of α and projection lens distance. This is achieved by effectively increasing the normalized projection lens distance δ. Note that the present invention is not limited to two or four partitions, which are demonstrated herein, and in fact any other number of partitions may be considered.

The case of a DMD with two partitions is illustrated in FIG. 1a, FIG. 1b, FIG. 6, FIG. 7 and FIG. 8. Each partition has a different axis of deflection. The illuminating beam is preferably also divided into two components, so that each partition is illuminated by a different component (again note that each illuminating component may be originating from separate illumination sources or from a split from a single illumination source using beam-splitting means).

Figure 6:
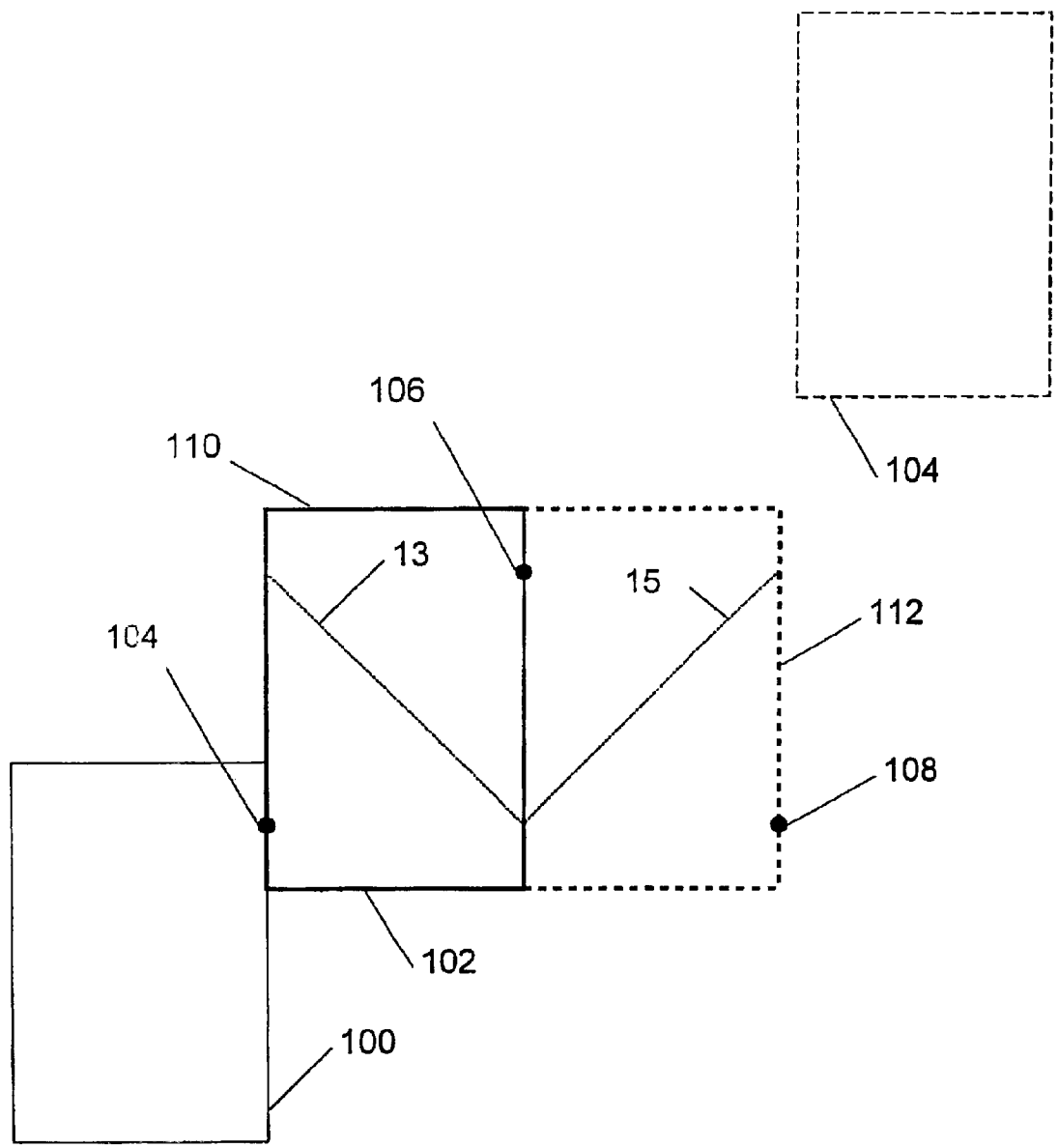
FIG. 6 demonstrates the "on" and "off" positions of a first component of an illuminating beam and the reflected beams from an element of a micromirrors array with two different tilt orientations in accordance with a preferred embodiment of the present invention, on the entrance plane of the projection lens.

FIG. 6 demonstrates the "on" and "off" positions of the reflected beams of a first component of the illuminating beam from an element of a micromirrors array with two different tilt orientations in accordance with a preferred embodiment of the present invention, on the entrance plane of the projection lens.

The directions of the axes of deflection are shown in by dotted lines on the "on" reflected beam footprint. The black circles in the figures mark the intersection points of the normals of the center pixels in each partition—104 being the normal of the first partition central pixel at an "on" position, 106 being the normal of the first partition central pixel at an "off" position as well as the normal of the second partition central pixel at an "off" position, and 108 being the normal of the second partition central pixel at an "on" position. Two of the circles coincide (106), and therefore only three circles are seen in the figure.

Figure 7:
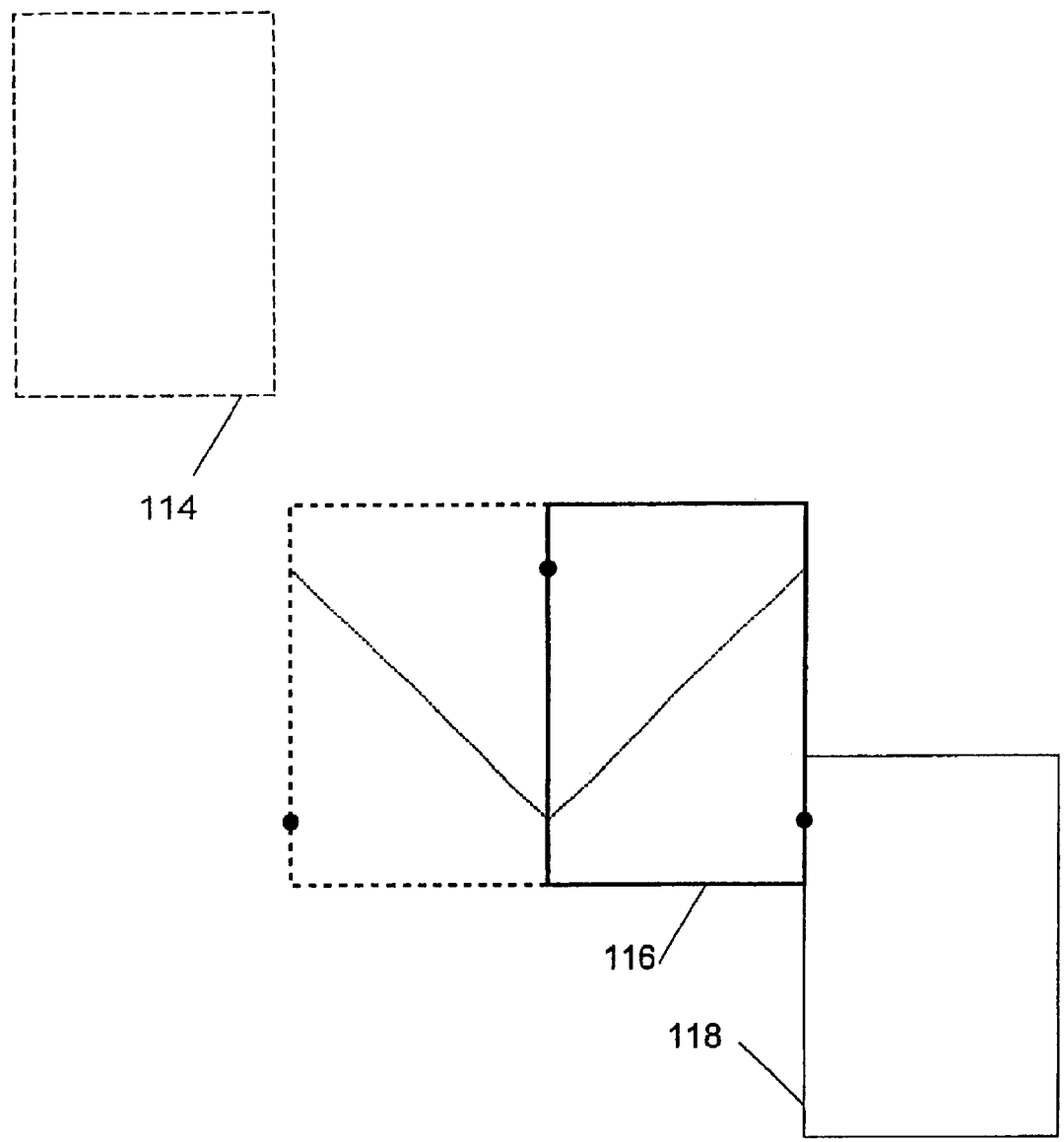
FIG. 7 demonstrates the "on" and "off" positions of a second component of an illuminating beam and the reflected beams from an element of a micromirrors array with two different tilt orientations in accordance with a preferred embodiment of the present invention, on the entrance plane of the projection lens.
Figure 8:
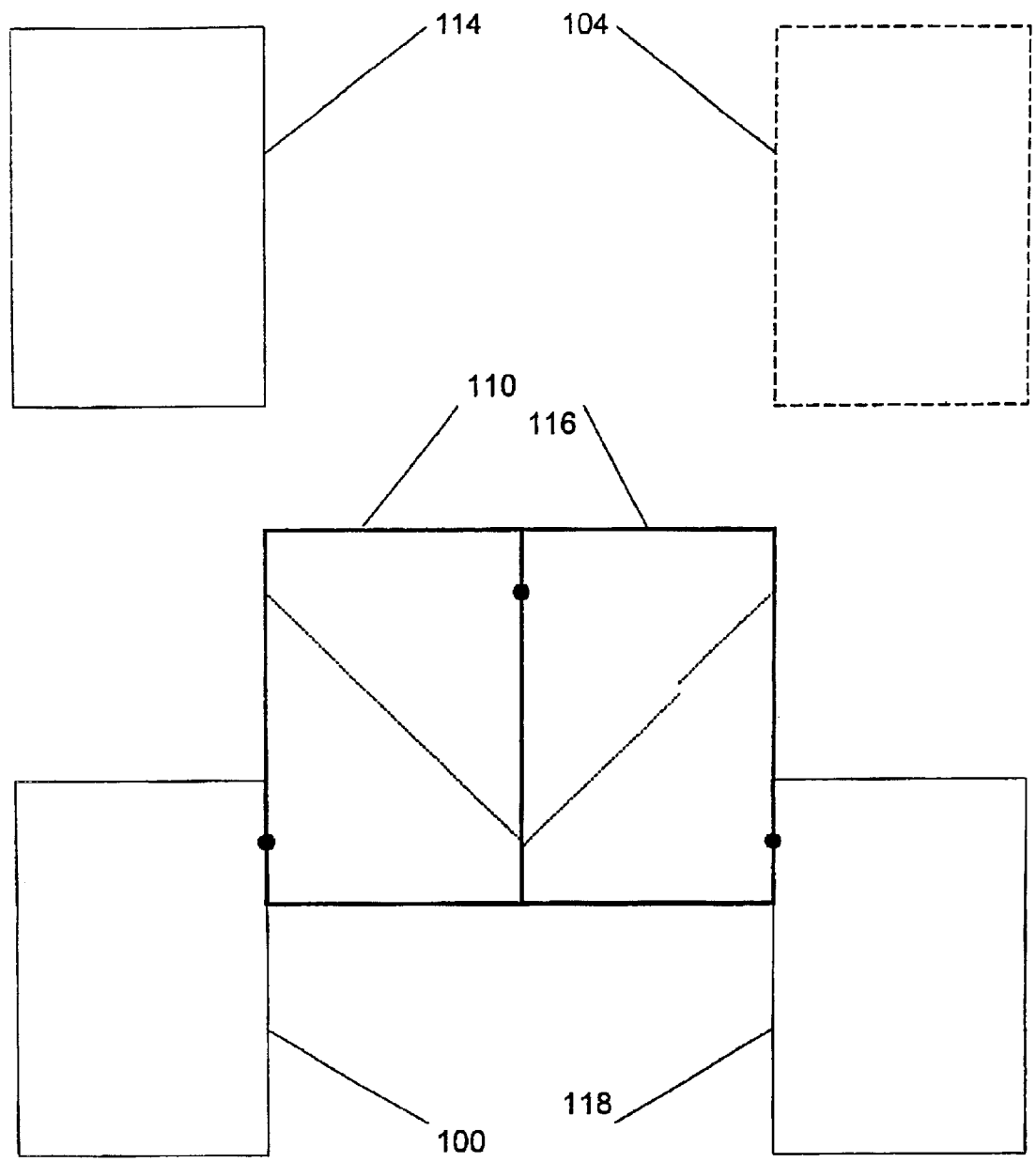
FIG. 8 illustrates the combined "on" and "off" positions of the first and second components of the illuminating beam and the reflected beams from an element of a micromirrors array with two different tilt orientations in accordance with a preferred embodiment of the present invention, on the entrance plane of the projection lens.

FIG. 6 shows the footprints with only the first component of the illuminating beam. This component illuminates only one partition of the DMD (not shown in the drawing since it is at the viewer eyepoint plane, the three-dimensional drawings of FIG. 1a and FIG. 1b better illustrate it), and gives rise to two reflected beams. The "on" beam 102 is marked by bold line contour, and the "off" beam 104 by a dashed line contour. Note that the beam-paths suggested in FIGS. 1a, 1b, and 6 are not essential in the present invention the illuminating components' beam paths may cross each other or be totally separated, as long as the optical configuration allows each zone of micromirror elements to be separately illuminated and the on position of the elements in that zone direct the illuminating beam in a predetermined direction into the lens. FIG. 7 shows the footprints with only the second component of the illuminating beam. This time the second partition of the DMD is illuminated, showing the illuminating beam 118, the "on" beam 116 and the "off" beam 114—all pertaining to the second component of the illuminating beam. Finally, FIG. 8 shows the complete picture of the optical geometry.

If the lens distance is kept the same as in FIG. 4, we see that the distance between the normals intersection points for each partition is reduced by 50%. Thus, the effective δ parameter value is increased by 50% from 4 to 6. The corresponding value of θ is ~5.4°.

The étendue scales as $\theta^2$ (see Equation 2). Therefore, the potential gain in light output is $$\text{Gain} = \left(\frac{5.4}{3.1}\right)^2 \approx 3$$ Equation (6)

Figure 9:
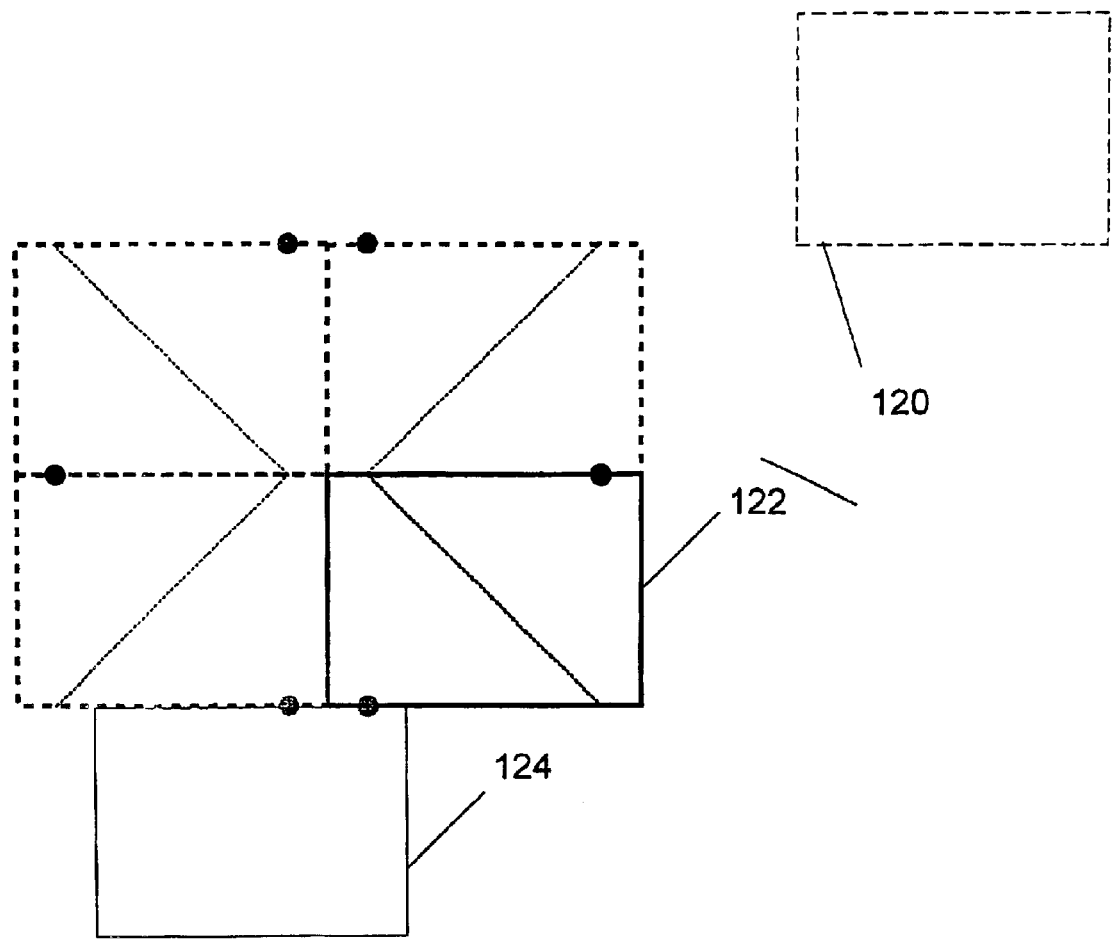
FIG. 9 illustrates combined "on" and "off" positions of the first and second components of the illuminating beam and the reflected beams from an element of a micromirrors array with four different tilt orientations in accordance with a preferred embodiment of the present invention, on the entrance plane of the projection lens.
Figure 10:
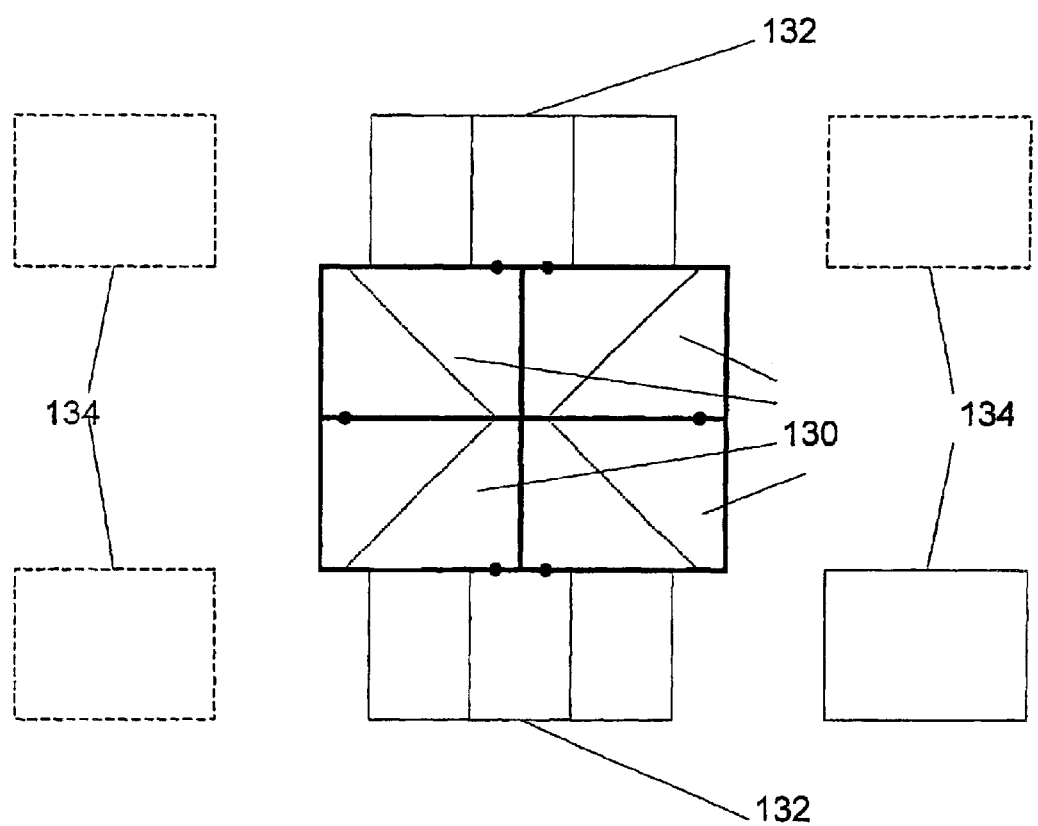
FIG. 10 illustrates "on" and "off" positions of four zones in a micromirrors array with four tilt orientations in accordance with an embodiment of the present invention.

Dividing the DMD into four partitions can further increase the gain. A possible arrangement with four partitions is shown in FIG. 9 and FIG. 10 (see also FIG. 2 and FIG. 3). The illumination beam is divided also into four components accordingly. To explain the optical geometry, we show in FIG. 9 what happens if only one component of the illuminating beam is present (in analogy to FIG. 6 or FIG. 7)—124 denoting the relevant component of the illuminating beam, 122 being the "on" beam and 120 being the "off" beam. FIG. 10 shows the complete picture with all four components present—illuminating beams 132, "on" beams 130 and "off" beams 134. The deflection axes directions in each partition are shown again by the dotted lines in the "on" beams footprints. This increases the corresponding normalized lens distance by a factor of 2, and the corresponding value of the acceptance angle becomes 6.5°. This gives a potential gain of factor 4.4 relative to the normal DMD.

The DMD chip étendue determines the light output of the projector. It is determined by the chip area and mirror deflection. The cost of the DMD chip is very sensitive to both parameters.

The present invention discloses a DMD chip with increased étendue compared to a conventional DMD chip with the same area and deflection angle. This is achieved by dividing the micro-mirror array into two or more partitions, and splitting correspondingly the illuminating beam into two or more beams. Adjacent partitions have different directions of mirror tilt axis.

Although the description above contains many specific details, these should not be construed as limiting the scope of the invention but as merely providing illustrations of some of the presently preferred embodiments of this invention. For example, our analysis was done for central projection geometry and for a specific lens-chip distance. However, the same analysis principles can be applied also for non-central projection geometry (in particular, 100% offset) and other lens-chip distances, although the value of the gain factor will be different in each case. Also, the partitions need not be rectangular. One can envisage other division geometries that may provide optimal performance for given quality requirements.

It should be clear that the description of the embodiments and attached Figures set forth in this specification serves only for a better understanding of the invention, without limiting its scope as covered by the following Claims and their equivalents.

It should also be clear that a person skilled in the art, after reading the present specification could make adjustments or amendments to the attached. Figures and above described embodiments that would still be covered by the following Claims and their equivalents.

What is claimed is:

1. A micromirror array device comprising at least two of a plurality of zones of separately controllable tiltable reflective elements, each of the tiltable reflective elements of a zone being tiltable about an axis of predetermined tilt orientation associated with the zone between a first reflecting position reflecting an incident beam to a predetermined first "on" direction shared by all reflective elements of said at least two of plurality of zones, and a second reflecting position reflecting the incident beam to a predetermined second "off"direction, each of said at least two of a plurality of zones having a predetermined off direction for all the reflecting elements in that zone, that is different from the off direction of at least one other zone of said at least two of a plurality of zones, wherein each of said at least two of a plurality of zones having a predetermined tilt orientation for all the reflective elements in that zone, that is different from the tilt orientation of at least one other zone of said at least two of a plurality of zones.

2. The device of claim 1, wherein said at least two of a plurality of zones comprise two zones.

3. The device of claim 1, wherein said at least two of a plurality of zones comprise four zones.

4. The device of claim 1, wherein the predetermined tilt orientation for all the reflective elements in that zone is orthogonal to the tilt orientation of the one other zone of said at least two of a plurality of zones.

5. The device of claim 1, wherein said at least two of a plurality of zones are adjacent each other.

6. The device of claim 1, wherein each reflective element is electrically actuated, being separately controlled by a control unit.

7. The device of claim 1, wherein a lens is further provided in front of the array in a predetermined distance from the array, placed in the on direction of all the reflective elements, of the plurality of zones.

8. The device of claim 7, wherein a normal of a given reflective element in a zone of said at least two of a plurality of zones, when the reflective element is positioned in the on direction coincides at a point on a plane adjacent the lens with a normal of a corresponding reflective element in one other zone of said at least two of a plurality of zones, when the corresponding reflective element is positioned in the off direction.

9. A method for steering light comprising
providing at least two of a plurality of zones of separately controllable tiltable reflective elements, each of the tiltable reflective elements of a zone being capable of tilting about an axis of predetermined tilt orientation associated with the zone between a first reflecting position reflecting an incident beam to a predetermined first "on" direction shared by all reflective elements of said at least two of a plurality of zones, and a second "off" reflecting position reflecting the incident beam to a predetermined second direction, each of said at least two of a plurality of zones having a predetermined off direction for all the reflective elements in that zone, that is different from the off direction of at least one other zone of said at least two of a plurality of zones, wherein each of said at least two of a plurality of zones having a predetermined tilt orientation for all the reflective elements in that zone, that is different from the tilt orientation for at least one other zone of said at least two of a plurality of zones;
providing an illuminating beam source for separately illuminating each of said at least two of a plurality of zones of separately controllable tiltable reflective elements
illuminating said at least two of a plurality of zones of separately controllable tiltable reflective elements;
separately manipulating each of the separately controllable tiltable reflective elements between the on direction and off direction.

10. The method of claim 9, wherein said at least two of a plurality of zones comprise two zones.

11. The method of claim 9, wherein said at least two of a plurality of zones comprise four zones.

12. An image projection system comprising:
illumination system for providing a plurality of illumination paths;
micromirror array device comprising at least two of a plurality of zones of separately controllable tiltable reflective elements, each of the tiltable reflective elements of a zone is operable for tilting about an axis of predetermined tilt orientation associated with the zone between a first reflecting position reflecting an incident beam to a predetermined first "on" direction shared by all reflective elements of said at least two of a plurality of zones, and a second reflecting position reflecting the incident beam to a predetermined second direction, each of said at least two of a plurality of zones having a predetermined off direction for all the reflecting elements in that zone, that is different from the off direction of at least one other zone of said at least two of a plurality of zones wherein each of said at least two of a plurality of zones of the micromirror device having a predetermined tilt orientation for all the reflective elements in that zone, that is different from the tilt orientation of at least one other zone of said at least two of a plurality of zones;
projection lens; and
at least two of a plurality of black cavities, corresponding to the number of "off" directions, for disposal of rejected light beams reflected in the "off" directions,
wherein each illumination path of the illumination system illuminates a different zone of the micromirror array device,
whereby each illumination path of the illumination system is reflected towards one of the black cavities when the reflective elements of the zone which the illumination path illuminates are tilted in the off direction or reflected towards the projection lens when the reflective elements of the zone which the illumination path illuminates are tilted in the on direction.

13. The system of claim 12, wherein said at least two of a plurality of zones comprise two zones.

14. The system of claim 12, wherein said at least two of a plurality of zones comprise four zones.

15. The system of claim 12, wherein the predetermined tilt orientation for all the reflective elements of the micromirror device in that zone is orthogonal to the tilt orientation of the one other zone of said at least two of a plurality of zones.

16. The system of claim 12, wherein said at least two of a plurality of zones are adjacent each other.

17. The system of claim 12, wherein each reflective element of the micromirror device is electrically actuated, being separately controlled by a control unit.

18. The system of claim 12, wherein a lens is further provided in front of the array in a predetermined distance from the array, placed in the on direction of all the reflective elements, of the plurality of zones.

19. The system of claim 18, wherein a normal of a given reflective element in a zone of said at least two of a plurality of zones, when the reflective element is positioned in the on direction coincides at a point on a plane adjacent the lens with a normal of a corresponding reflective element in one other zone of said at least two of a plurality of zones, when the corresponding reflective element is positioned in the off direction.

20. A method for image projection comprising:
providing illumination system for providing a plurality of illumination paths;

providing a micromirror array device comprising at least two of a plurality of zones of separately controllable tiltable reflective elements, each of the tillable reflective elements of a zone is operable for tilting about an axis of predetermined tilt orientation associated with the zone between a first reflecting position reflecting an incident beam to a predetermined first "on" direction shared by all reflective elements of said at least two of a plurality of zones, and a second reflecting position reflecting the incident beam to a predetermined second "off" direction, each of said at least of a plurality of zones having a predetermined off direction for all the reflective elements in that zone, that is different from the off direction of at least one other zone of said at least two of a plurality of zones;

providing a projection lens;

providing at least two of a plurality of black cavities, corresponding to the number of "off" directions, for disposal of rejected light beams reflected in the "off" directions, wherein each illumination path of the illumination system illuminates a different zone of the micromirror array device;

illuminating said at least two of a plurality of zones of separately controllable tiltable reflective elements, each zone illuminated by a different illumination path; separately manipulating each of the separately controllable tiltable reflective elements between the on direction and off direction.

21. The method of claim 20, wherein each of said at least two of a plurality of zones having a predetermined tilt orientation for all the reflective elements in that zone, that is different from the tilt orientation of at least one other zone of said at least two of a plurality of zones.

22. The method of claim 20, wherein said at least two of a plurality of zones comprise two zones.

23. The method of claim 20, wherein said at least two of a plurality of zones comprise four zones.

* * * * *